(12) United States Patent
Yoshida

(10) Patent No.: US 7,825,896 B2
(45) Date of Patent: Nov. 2, 2010

(54) MULTIPLE CURSOR SYSTEM

(75) Inventor: Ichiro Yoshida, Takahama (JP)

(73) Assignee: DENSO CORPORATION, Kariya (JP)

( * ) Notice: Subject to any disclaimer, the term of this patent is extended or adjusted under 35 U.S.C. 154(b) by 1065 days.

(21) Appl. No.: 11/541,777

(22) Filed: Oct. 3, 2006

(65) Prior Publication Data

US 2007/0094618 A1    Apr. 26, 2007

(30) Foreign Application Priority Data

Oct. 24, 2005    (JP)    ............... 2005-308524

(51) Int. Cl.
G09G 5/08    (2006.01)
(52) U.S. Cl. .................. 345/157; 715/754; 715/856
(58) Field of Classification Search ......... 345/156–169; 715/856, 751, 754
See application file for complete search history.

(56) References Cited

U.S. PATENT DOCUMENTS

| | | | |
|---|---|---|---|
| 5,649,104 A | 7/1997 | Carleton et al. | |
| 5,704,042 A | 12/1997 | Hester et al. | |
| 5,717,856 A | 2/1998 | Carleton et al. | |
| 5,717,857 A | 2/1998 | Burkman et al. | |
| 5,781,727 A | 7/1998 | Carleton et al. | |
| 5,819,038 A | 10/1998 | Carleton et al. | |
| 5,838,914 A | 11/1998 | Carleton et al. | |
| 5,872,923 A | 2/1999 | Schwartz et al. | |
| 5,900,869 A * | 5/1999 | Higashio | 715/856 |
| 5,917,472 A * | 6/1999 | Perala | 345/157 |
| 5,920,693 A | 7/1999 | Burkman et al. | |
| 5,920,694 A | 7/1999 | Carleton et al. | |
| 5,948,022 A | 9/1999 | Carleton et al. | |
| 6,061,717 A | 5/2000 | Carleton et al. | |
| 2004/0075644 A1 * | 4/2004 | Morinaga et al. | 345/157 |
| 2004/0236825 A1 | 11/2004 | Doi et al. | |
| 2005/0272505 A1 | 12/2005 | Okamura | |

FOREIGN PATENT DOCUMENTS

| | | | |
|---|---|---|---|
| JP | A-06-028095 | | 2/1994 |
| JP | A-08-036546 | | 2/1996 |
| JP | A-2001-034411 | | 2/2001 |
| JP | 2004021595 | * | 1/2004 |
| JP | A-2004-021595 | | 1/2004 |
| JP | A-2004-151835 | | 5/2004 |
| JP | A-2005-269520 | | 9/2005 |

OTHER PUBLICATIONS

Office Action dated Feb. 9, 2010 from Japan Patent Office in the corresponding JP application No. 2005-308524 (and English translation).

* cited by examiner

*Primary Examiner*—Regina Liang
(74) *Attorney, Agent, or Firm*—Posz Law Group, PLLC (57) ABSTRACT

A multiple cursor system includes multiple control devices for respectively controlling one of multiple cursors displayed on a display unit, a communication unit for simultaneously establishing multiple communication links with multiple control devices for data communication, a cursor operation recognition unit for recognizing a cursor operation on each of the multiple control devices when the communication links with the multiple control devices are being established, and a control unit for controlling display of the multiple cursors respectively representing the multiple control devices based on the cursor operation on each of the multiple control devices and for executing an instructed process based on an instruction in association with a position of one of the multiple cursors.

10 Claims, 10 Drawing Sheets

PERSONAL RECORD REGISTRATION

1. ADDRESS : A PREF.
2. NAME :
3. TEL NO. : 056
4. VEHICLE NO. :
5. PLACE OF WORK :
6. BIRTH DATE :

FIG. 10B

PERSONAL RECORD REGISTRATION

1. ADDRESS : A PREF, K CITY
2. NAME :
3. TEL NO. : 0566-25-43
4. VEHICLE NO. :
5. PLACE OF WORK : C CORP.
6. BIRTH DATE :

MULTIPLE CURSOR SYSTEM

CROSS REFERENCE TO RELATED APPLICATION

This application is based on and claims the benefit of priority of Japanese Patent Application No. 2005-308524 filed on Oct. 24, 2005, the disclosure of which is incorporated herein by reference.

FIELD OF THE INVENTION

The present invention generally relates to an input system for a computer.

BACKGROUND OF THE INVENTION

In recent years, an automotive vehicle is equipped with, for example, a navigation system that has a computer system included therein with a display unit for displaying navigation information. Users of the navigation system in the vehicle may be constrained to use only one pointing device such as a remote controller that is linked to an input cursor displayed on the display unit for conducting an input operation. In this case, the users, that is, a driver and other occupants in the vehicle, may have to pass the remote controller around among them for directly controlling the input operation or may have to tell a remote controller holder for controlling the remote controller on behalf of him/her so as to achieve an intended control of the navigation system. Japanese patent document JP-A-H07-177487 discloses a computer system that connects multiple terminals on a network for sharing and accumulating data for conducting distributed data processing and for displaying the result of the processing. In addition, Japanese patent document JP-A-H08-36546 discloses a networked computer system that collaboratively conducts an input operation and an output display operation for application software by using network communication.

However, the disclosure in the Japanese patent document JP-A-H07-177487 has a problem that the user on each of the multiple terminal cannot share the same display unit because of the distance between the multiple terminals. The disclosure in the Japanese patent document JP-A-H08-36546 also has a problem that a system structure is complicated because of a transparent board disposed on each of the terminals on the networked system. Therefore, neither of the two disclosures described above does not contribute to an improved operability of, for example, the navigation system when two or more users are collaboratively operating the navigation system to search and input a destination of a travel.

SUMMARY OF THE INVENTION

In view of the above-described and other problems, the present disclosure provides a multiple cursor system that allows plural users to collaboratively and simultaneously input instructions and/or data by using multiple cursors on a display unit of a computer system.

In one aspect of the present disclosure, the multiple cursor system for controlling multiple cursors based on communication with multiple control devices includes a communication unit for simultaneously establishing multiple communication links with multiple control devices for data communication, a cursor operation recognition unit for recognizing a cursor operation on each of the multiple control devices when the communication links with the multiple control devices are being established, a display unit for providing display space of the multiple cursors in association with information of interest and a control unit for controlling display of the multiple cursors respectively representing one of the multiple control devices based on the cursor operation on each of the multiple control devices and for executing an instructed process based on an instruction relative to a position of one of the multiple cursors.

The multiple cursor system having communication with multiple control devices held by multiple users can provide for each of the multiple users freedom of cursor control simultaneously, thereby enabling the multiple users to collaboratively instruct a computer system to search for a destination, to register information or to perform other operation. In addition, the multiple cursor system does not use the transparent board used in the system disclosed in a prior art, thereby enabling the multiple cursor system to have a simplified structure.

In another aspect of the present disclosure, each of the multiple cursors is represented differently on the display unit so that the user can easily recognize the cursor on which he/she has a control.

In yet another aspect of the present disclosure, each of the multiple cursors is represented on the display unit based on a setting specified on each of the multiple control devices respectively held by the multiple user. In this manner, the user can select and can easily recognize the cursor on the display unit.

In still yet another aspect of the present disclosure, the movement of the cursor on the display unit controlled by the control unit corresponds to the movement of the cursor on the control device, thereby providing for the user the ease of control of the cursor.

In still yet another aspect of the present disclosure, the position of the cursor on the display unit is controlled in association of the position of the cursor on the control device, thereby enabling the user to easily identifying his/her own cursor on the display unit. More specifically, a home position of the cursor on the control device corresponds to the home position of the cursor on the display unit so that the user of a specific cursor can easily regain a control on his/her own cursor after losing track of the position of the cursor on the display unit.

In still yet another aspect of the present disclosure, the control unit switches screens on the display unit after a request for switching the screens from one of the multiple users is affirmed by other users so that the multiple users can collaboratively use the same screen for an input, a search or the like. In this case, an input for a certain column or a certain search condition is exclusively allowed for only one user at a time so as to avoid conflict between the multiple users.

BRIEF DESCRIPTION OF THE DRAWINGS

Other objects, features and advantages of the present disclosure will become more apparent from the following detailed description made with reference to the accompanying drawings, in which.

DETAILED DESCRIPTION OF THE PREFERRED EMBODIMENTS

The present invention will be described in detail with reference to various embodiments, in which the same reference numerals designate same or similar members.

The disclosure of the present invention describes a multiple cursor system applied to a navigation system 1 for use in a vehicle.

Figure 1:
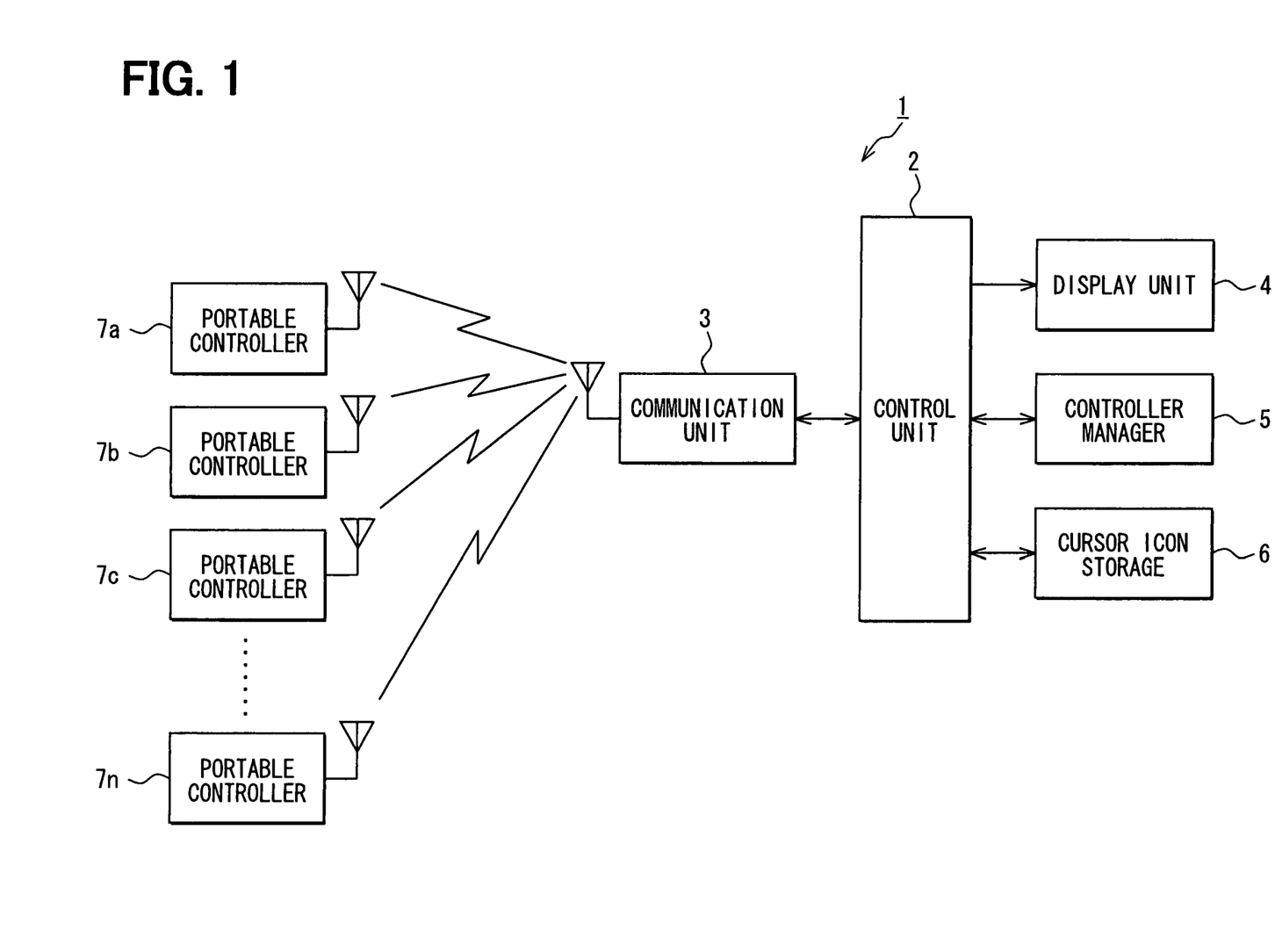
FIG. 1 shows a block diagram of a navigation system having a multiple cursor system in an embodiment of the present disclosure.

FIG. 1 shows a block diagram of the navigation system 1 in an embodiment of the present disclosure. The navigation system 1 is disposed in a room of the vehicle, and includes a control unit 2, a communication unit 3, a display unit 4, a controller manager 5, and a cursor icon storage 6. The navigation system 1 further includes a position detector, a map data storage, a voice output unit and other units for providing route navigation to a user. The explanation of these additional parts are omitted for the brevity of description of the present disclosure.

The control unit 2 includes a CPU, a RAM, a ROM, an I/O bus and the like. The control unit 2 controls overall operations of the navigation system 1. The communication unit 3 communicates with portable controllers 7a to 7n used in the room of the vehicle. The communication between the communication unit 3 and the portable controllers 7a to 7n is based on a protocol such as, for example, Bluetooth connection (Registered trademark), a wireless LAN connection or the like that supports simultaneous multiple connections between the communication unit 3 and multiple portable controllers 7a to 7n.

The display unit 4 has, for example, a liquid crystal display with a touch panel, and displays inputted instructions based on display instructions from the control unit 2. The display unit 4 outputs touch key operations as operation detection signal to the control unit 2.

The controller manager 5 controls wireless communication with the portable controllers 7a to 7n. The cursor icon storage 6 stores cursor icons that appear on the display unit 4. The control unit 2 controls retrieval of the cursor icons from the cursor icon storage 6 and also controls display of the cursor icons on the display unit 4. The cursor icons in the cursor icon storage 6 for representing the portable controllers 7a to 7n are respectively different from each other. Further, in the present embodiment, the portable controllers 7a to 7n are portable devices such as cellular phones, PDAs (Personal Digital Assistants) or the like.

The operation scheme of the navigation system 1 equipped with the multiple cursor system in the present embodiment is described with reference to FIGS. 2, 10A, 10B, and 10C. The multiple cursor system is controlled by plural users A, B, and C in the vehicle. That is, each of the plural users A, B, and C has the portable controller that communicates with the navigation system 1 for controlling the multiple cursor system.

Figure 2:
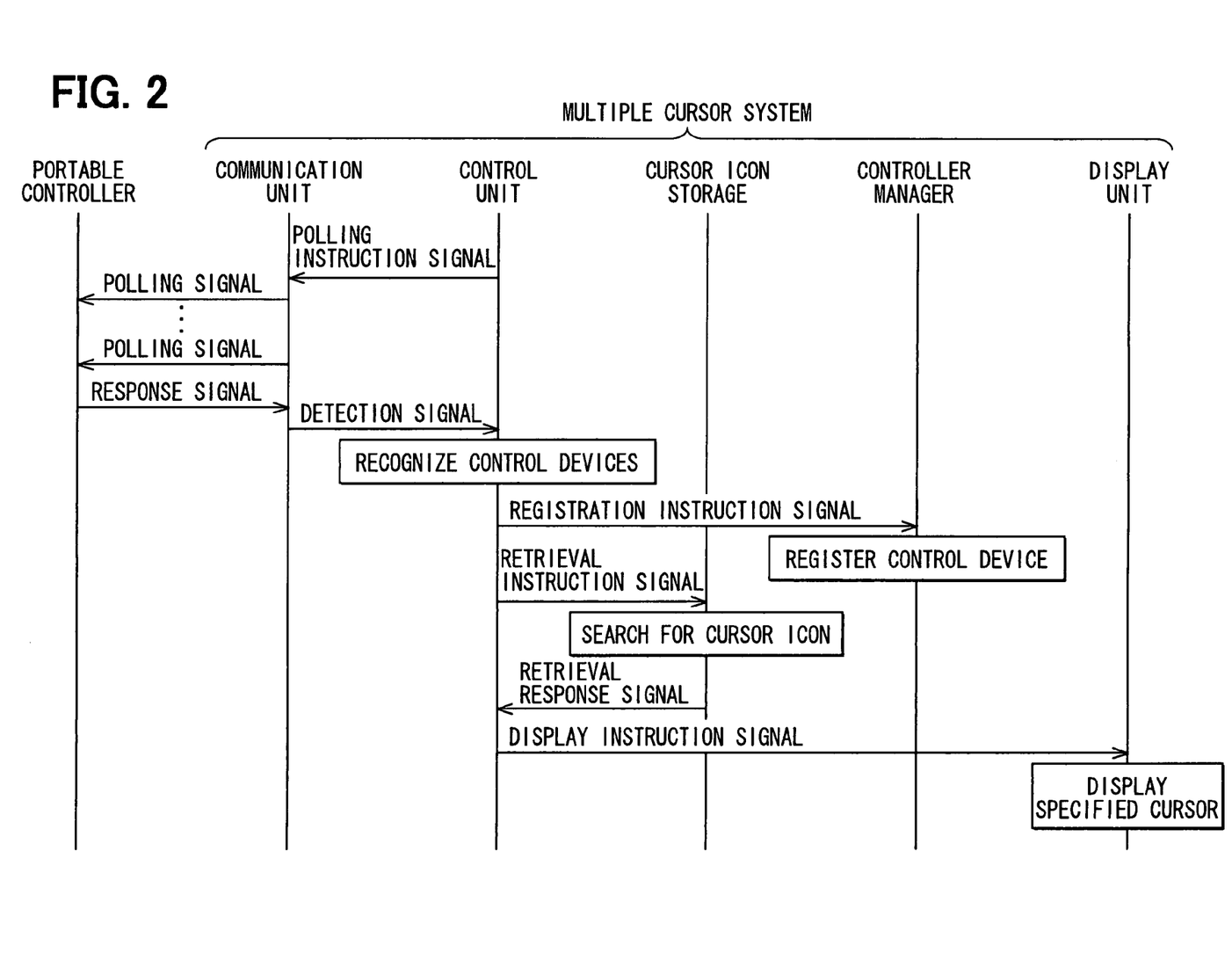
FIG. 2 shows an operation sequence chart of the multiple cursor system in the embodiment of the present disclosure.

FIG. 2 shows an operation sequence chart of the multiple cursor system in the present embodiment. The control unit 2 outputs a polling instruction signal to the communication unit 3 to communicate with the portable controllers 7a to 7c by using a polling signal (radio signal). The portable controllers 7a to 7c respond to the polling signal by transmitting a response signal in response to the polling signal when the portable controllers 7a to 7c exist within a communication range of the polling signal (e.g., in the room of the vehicle). The response signal from each of the portable controllers 7a to 7c includes an identification code of the portable controller 7a, 7b or 7c.

The control unit 2 analyzes the response signal received by the communication unit 3 upon receiving a detection signal sent from the communication unit 3 to the control unit 2, and recognizes the portable controllers 7a to 7c that responded to the polling signal. Then, the control unit 2 outputs a registration instruction signal to the controller manager 5 for registering established communication links with the portable controllers 7a to 7c. Then, the control unit 2 outputs a retrieval instruction signal to the cursor icon storage 6 for retrieving cursor icons that correspond to the portable controllers 7a to 7c having established communication links. Then, the control unit 2 outputs a display instruction signal to the display unit 4 for displaying the cursor icons upon receiving a retrieval response signal from the cursor icon storage 6.

Figure 3A:
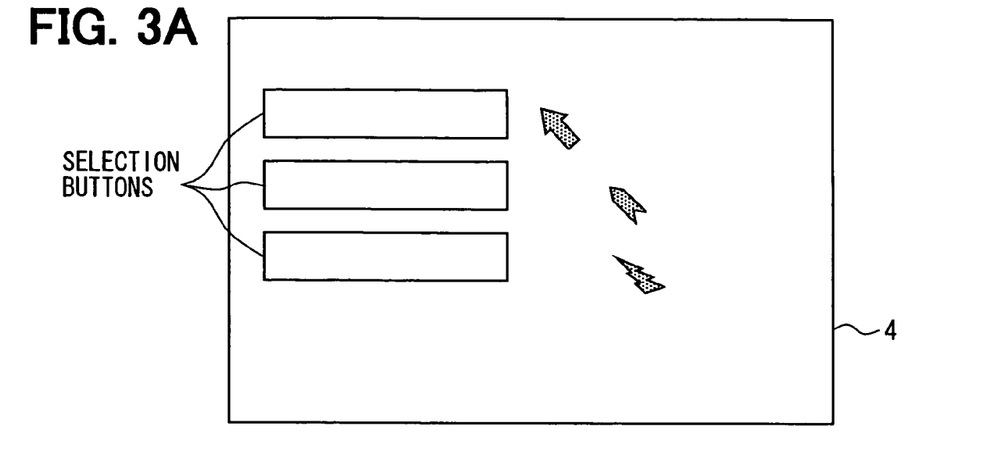
FIGS. 3A to 3C show illustrations of multiple cursors displayed on a screen of a display unit of the multiple cursor system.
Figure 3B:
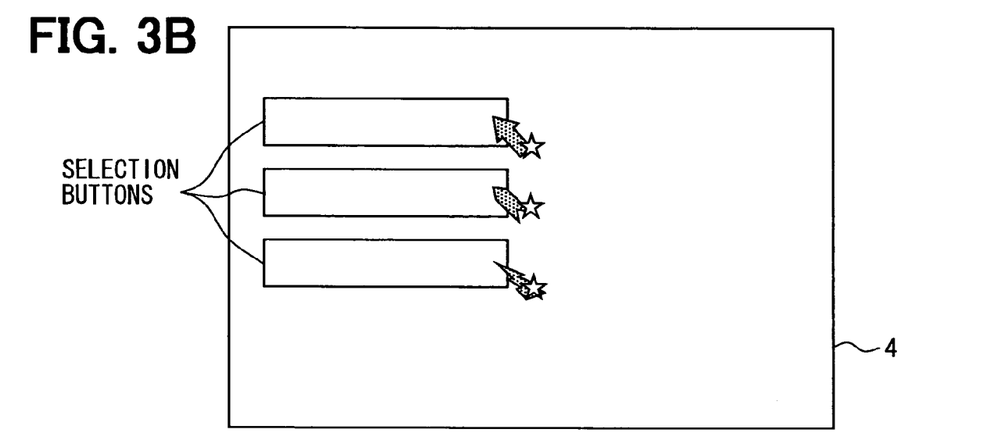
Figure 3C:
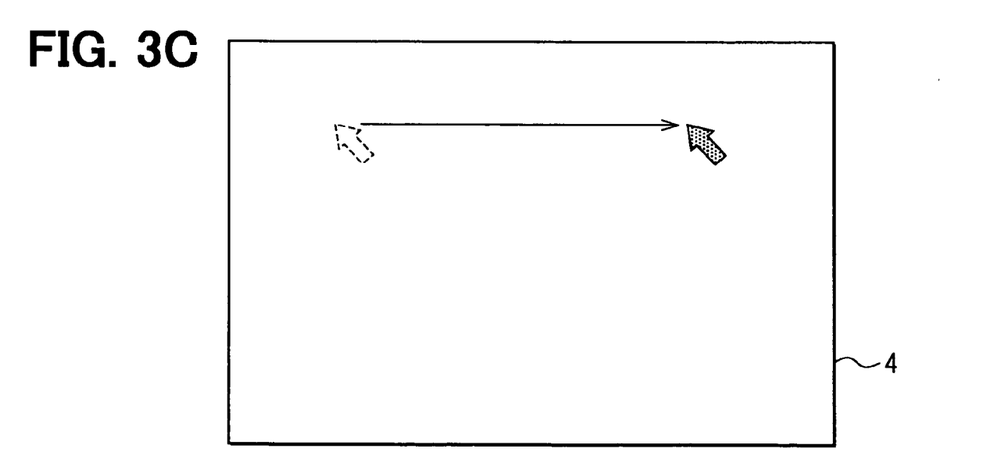

FIGS. 3A to 3C show illustrations of multiple cursors displayed on a screen of the display unit 4 of the multiple cursor system.

The control unit 2 controls the operation sequences described above with each of the portable controllers 7a to 7c held by the users A, B and C for displaying cursor icons on the display unit 4. In this case, the cursor icon in an arrow shape corresponds to the portable controller 7a held by the user A as shown in FIG. 3A, the cursor icon in a rocket shape corresponds to the portable controller 7b held by the user B, and the cursor icon in a lightning shape corresponds to the portable controller 7c held by the user C.

The control unit 2 also controls representation of the cursor icons on the display unit 4 in response to the movement and/or the cursor operation on the portable controllers 7a to 7c. That is, the control unit 2 shows an operability mark (a star shape in FIG. 3B) on top of the cursor icon when a position of the cursor icon on the display unit 4 falls within an operable area such as a selection button or the like as shown in FIG. 3B. The operability mark indicates that the cursor operation on the portable controller side can execute a certain process that is associated with a predetermined operation on the representation on the display unit 4. The control unit 2 does not show the operability mark when the position of the cursor icon is not within the operable area.

For example, the user A holding the portable controller 7a can perform a certain operation on the portable controller 7a to execute the predetermined operation in association with a press operation of the selection button displayed on the display unit 4 when the arrow shape cursor icon corresponding to the portable controller 7a has the operability mark on the selection button. On the other hand, the arrow shape cursor icon can not execute the predetermined operation when the cursor icon does not have the operability mark on the selection button.

Further, the movement of the cursor on the portable controller side is reflected on the movement of the cursor icon on the display unit 4 as shown in FIG. 3C. For example, when the user A moves the cursor from left to right on the portable controller 7a by rotating a track ball to the right or by pressing a right arrow button, the control unit 2 controls the movement of the cursor icon on the display unit 4 in proportion to the movement of the cursor on the controller 7a upon detecting the operation on the track ball or on the right arrow button. In this manner, each of the users A to C can operate the cursor icon by operating the portable controller 7a, 7b or 7c.

Furthermore, the control unit 2 controls the position of the cursor icon on the display unit 4 to be moved to a home position when, for example, the user A operates the controller 7a to position the cursor displayed on the controller 7a to go to a home position. In this manner, each of the users A to C can operate the cursor icons on the display unit 4 to be moved to the home position by operating the portable controller 7a, 7b or 7c.

Figure 4:
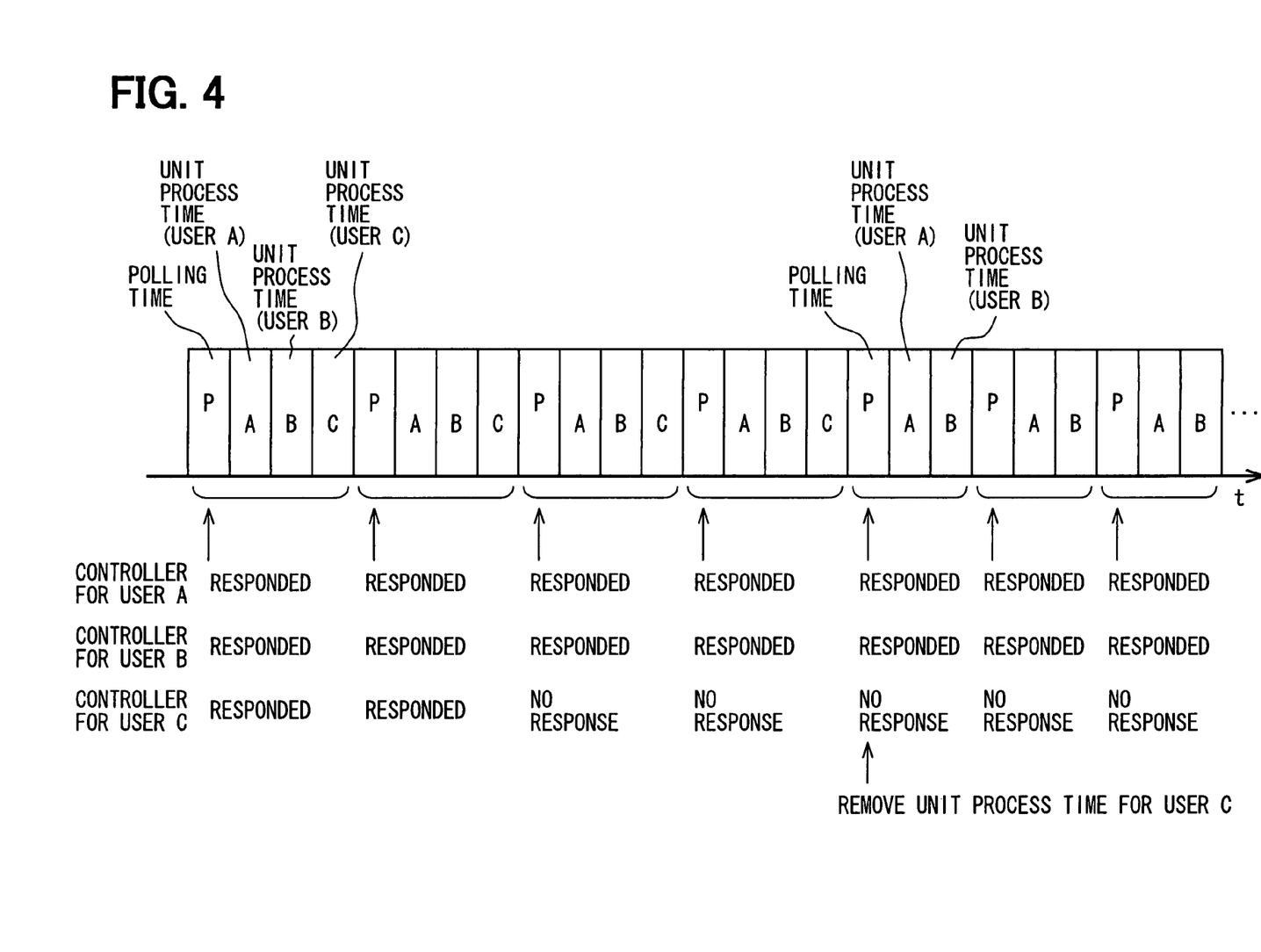
FIG. 4 shows a time chart that illustrates removal of unit process time from a user.
Figure 5:
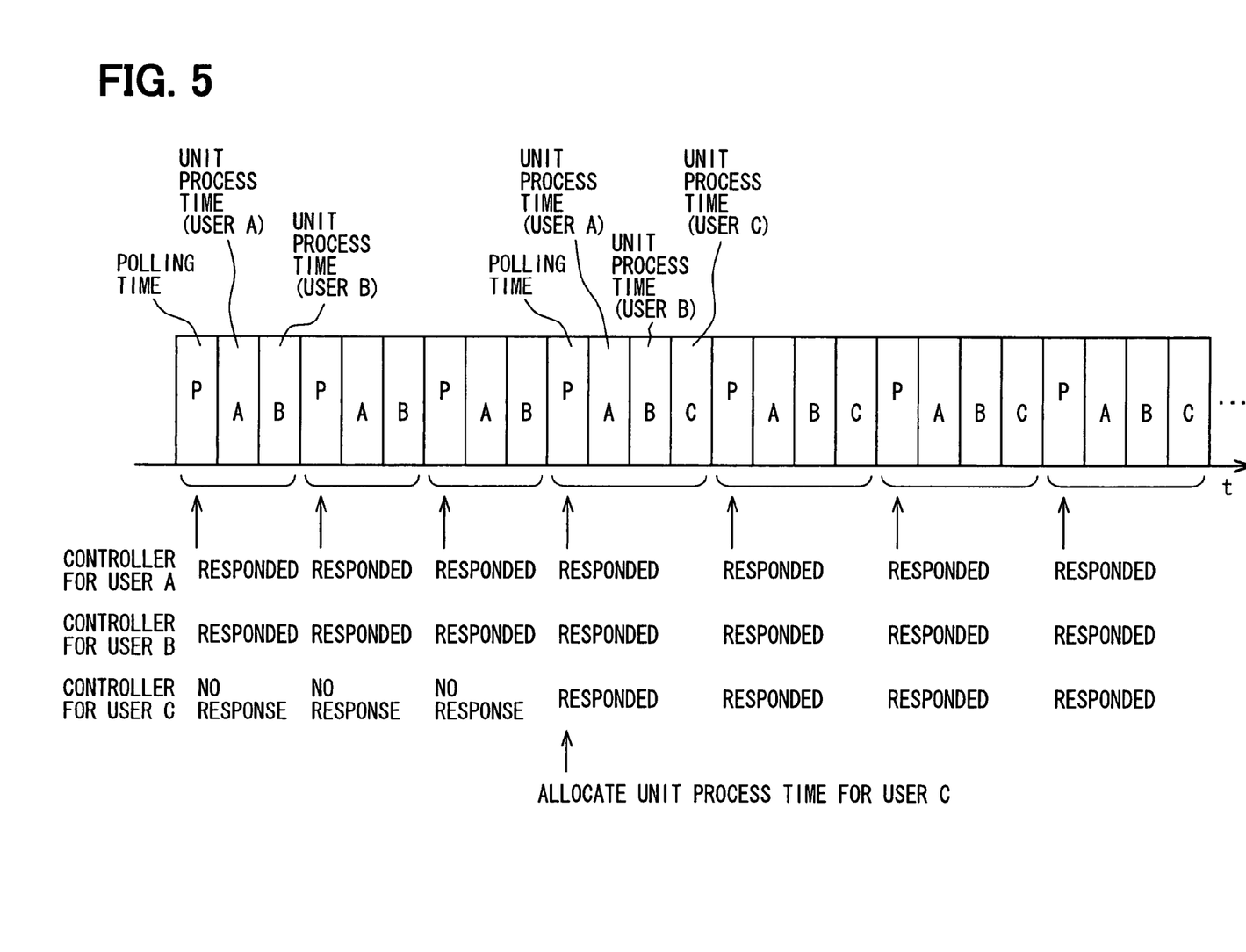
FIG. 5 shows a time chart that illustrates allocation of unit process time to the user.

FIG. 4 shows a time chart that illustrates removal of a unit process time for a user allocated between two polling times, and FIG. 5 shows a time chart that illustrates allocation of the unit process time for the user. The control unit 2 allocates and removes the unit process time for each of the portable controllers 7a to 7c by examining the response signal from the portable controllers 7a to 7c. For example, the communication unit 3 under control of the control unit 2 periodically transmits the polling signal in the polling time to the portable controllers 7a to 7c with the allocated unit process times for each of the portable controllers 7a to 7c respectively held by the users A to C when the portable controllers 7a to 7c respond to the polling signal within each slot of the polling time as shown in FIG. 5. The communication unit 3 under control of the control unit 2 removes the allocated unit process time for the portable controller 7c when the portable controller 7c does not respond to the polling signal in three consecutive times as shown in FIG. 4. In this manner, the control unit 2 efficiently allocates the unit process time for each of the portable controllers 7a to 7c.

User operations for the following cases are described with reference to the drawings.

(1) Destination search by multiple users in collaboration.

(2) Personal record registration by multiple users in collaboration.

In the following description, the cursor icon that represents the portable controller 7a held by the user A takes the shape of the arrow, and the cursor icon that represents the portable controller 7b held by the user B takes the shape of the rocket, and the cursor icon that represents the portable controller 7c held by the user C takes the shape of the lightning.

(1) Destination Search by Multiple Users in Collaboration.

Figure 6A:
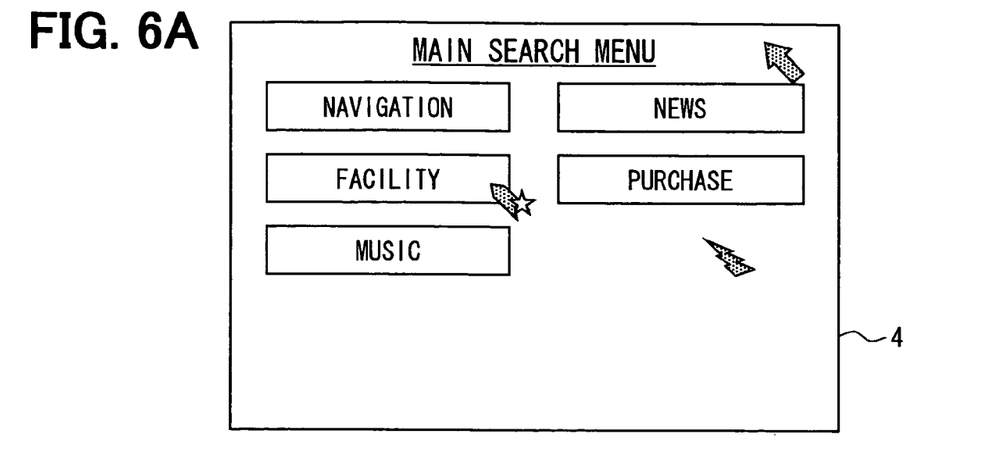
FIGS. 6A to 6C show illustrations of information search screen with multiple cursors displayed thereon.
Figure 6B:
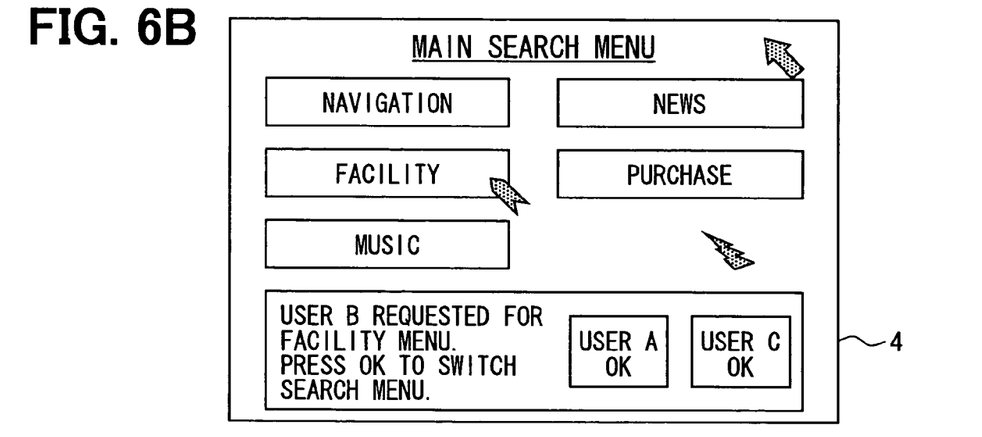
Figure 6C:
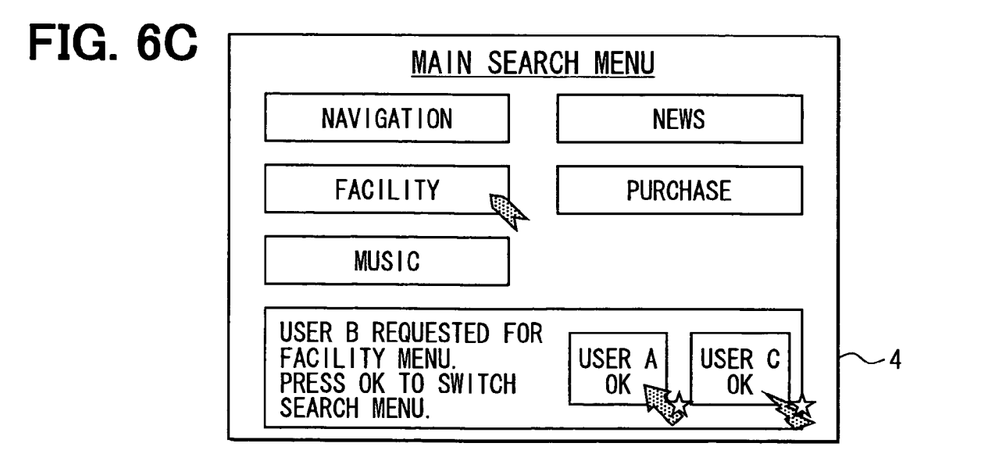
Figure 7A:
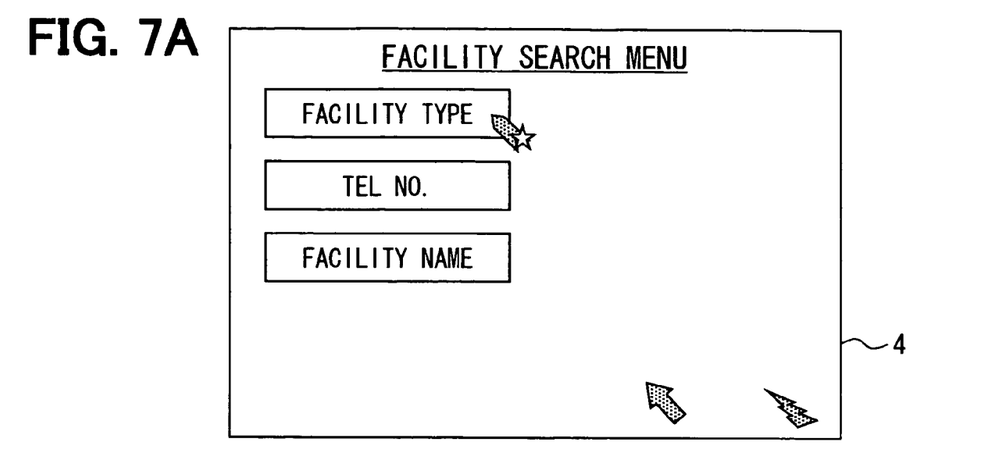
FIGS. 7A to 7C show illustrations of another information search screen with multiple cursors displayed thereon.
Figure 7B:
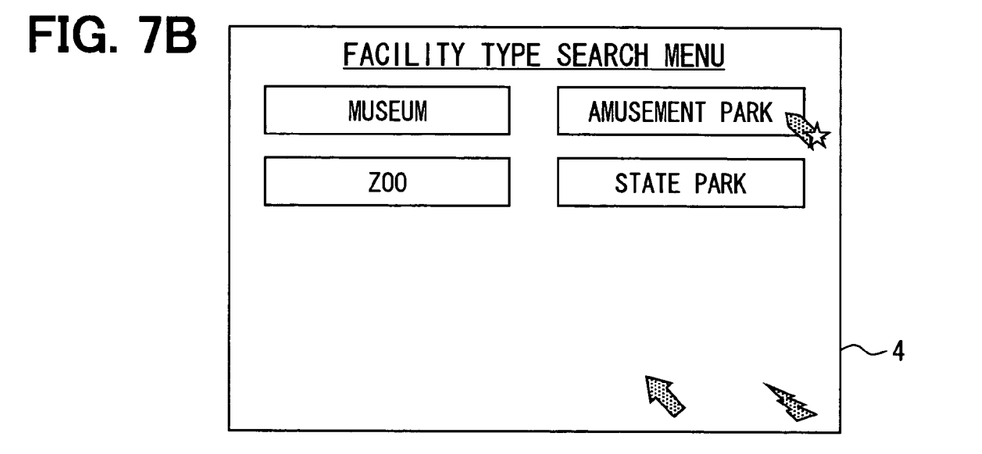
Figure 7C:
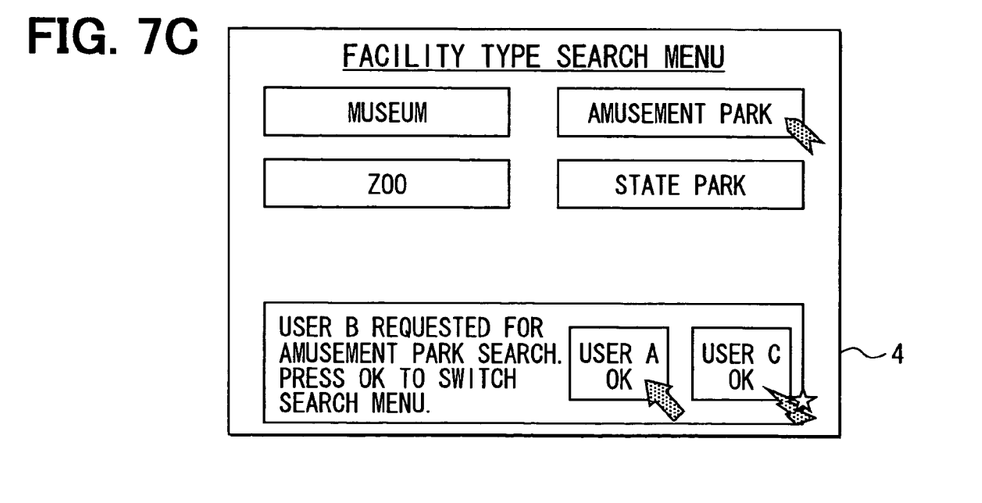
Figure 8A:
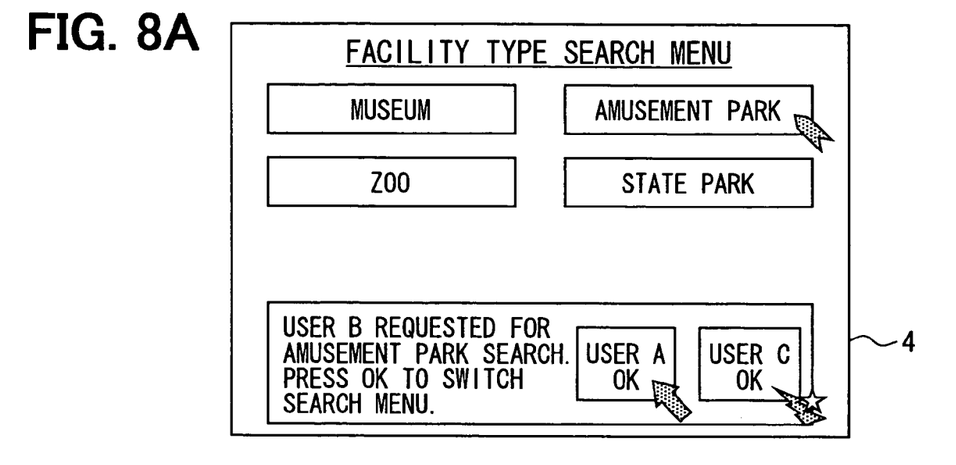
FIGS. 8A to 8C show illustrations of yet another information search screen with multiple cursors displayed thereon.
Figure 8B:
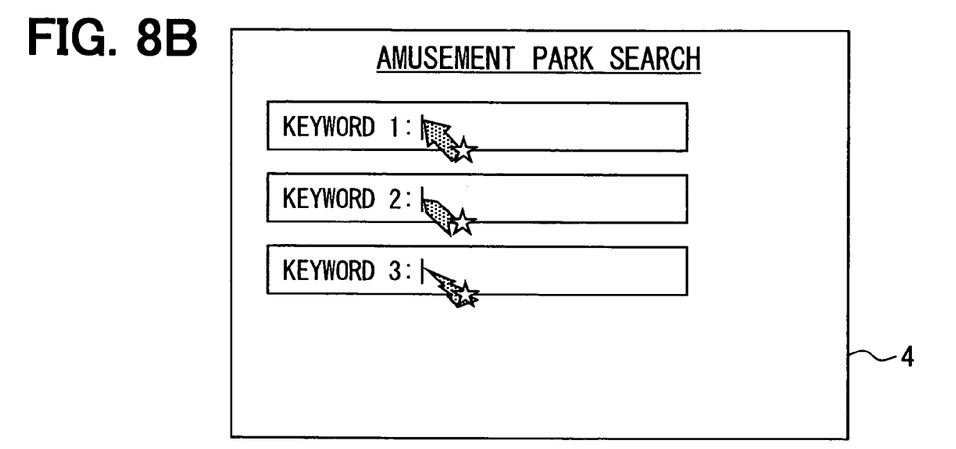
Figure 8C:
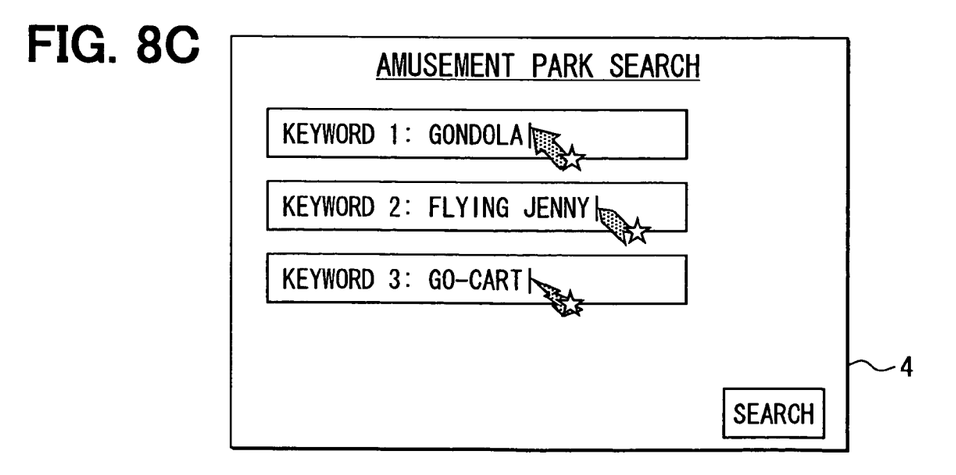
Figure 9:
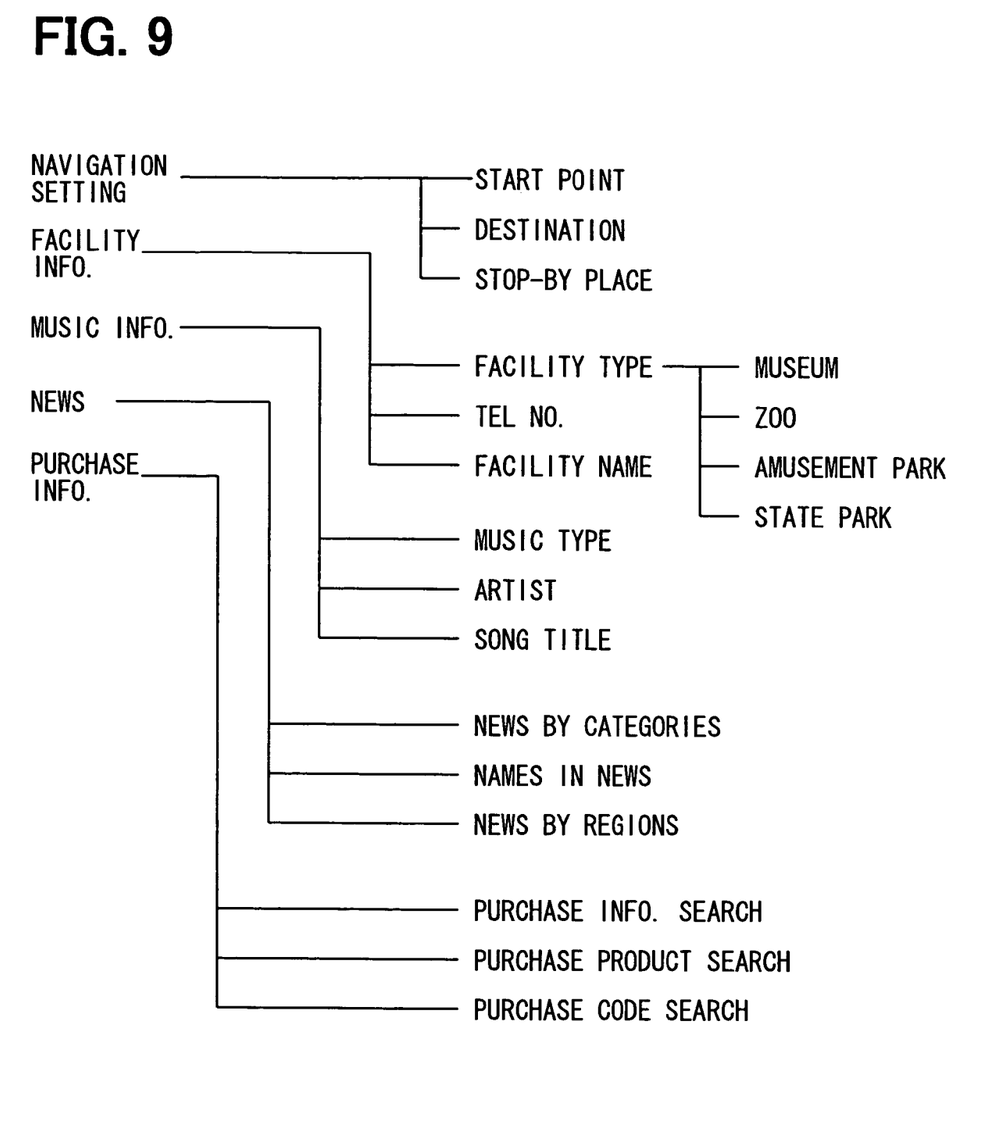
FIG. 9 shows a diagram of information registration hierarchy in the navigation system.

FIGS. 6A to 6C show illustrations of an information search screen with multiple cursor icons displayed on the display unit 4. FIGS. 7A to 7C show illustrations of another information search screen with multiple cursors. FIGS. 8A to 8C show illustrations of yet another information search screen with multiple cursors. FIG. 9 shows a diagram of information registration hierarchy in the navigation system 1.

The users A to C can select one of the select buttons displayed on the screen of a main search menu shown in FIG. 6A. For example, the control unit 2 displays a message that requests for permission to switch the menu screen for the users A and C upon detecting that user B clicks a facility search button. The message on the display unit 4 reads, for example, "User B requested for facility menu. Press OK to switch search menu." as shown in FIG. 6B. In this case, the user A and the user C can grant the request for switching the menu screen from the user B by pressing a user A OK button and a user C OK button.

Then, the control unit 2 displays a facility search menu in FIG. 7A on the screen upon detecting that the users A and C pressed the OK buttons as shown in FIG. 6C. Now, the user B can select one of the selection buttons in the facility search menu on the screen.

Then, the control unit 2 displays a facility type search menu on the screen in FIG. 7B upon detecting that the user B clicks a facility type button in the screen shown in FIG. 7A. Now, the user B can select one of the selection buttons in the facility type search menu on the screen.

Then, the control unit 2 displays a message that requests for permission to switch the menu screen for the users A and C upon detecting that user B clicks an amusement park search button. The message on the display unit 4 reads, for example, "User B requested for amusement park search. Press OK to switch search menu." as shown in FIG. 7C. In this case, the user A and the user C can grant the request for switching the search menu from the user B by pressing the user A OK button and the user C OK button.

Then, the control unit 2 displays an amusement park search menu in FIG. 8A on the screen upon detecting that the users A and C pressed the OK buttons as shown in FIG. 8A. Now, the user A and the user C in addition to the user B can input a keyword for the amusement park search. Then, the control unit 2 searches for the amusement park based on the inputted keywords as shown in FIG. 8C.

In this case, the control unit 2 in the navigation system 1 drills down the search menus organized in a hierarchy as shown in FIG. 9 for serving the requests from the users A to C. In addition, the control unit 2 recognizes an identification code for each of the search menus for controlling display of the message. Further, the control unit 2 prohibits the users A to C to input a same keyword for searching for the amusement park.

The multiple cursor system in the navigation system 1 allows the users A to C to collaboratively use the display unit 4 and to search for a destination of a travel by having inputs from the portable controllers 7a to 7c respectively operated by the users A to C.

(2) Personal Record Registration by Multiple Users in Collaboration.

Figure 10A:
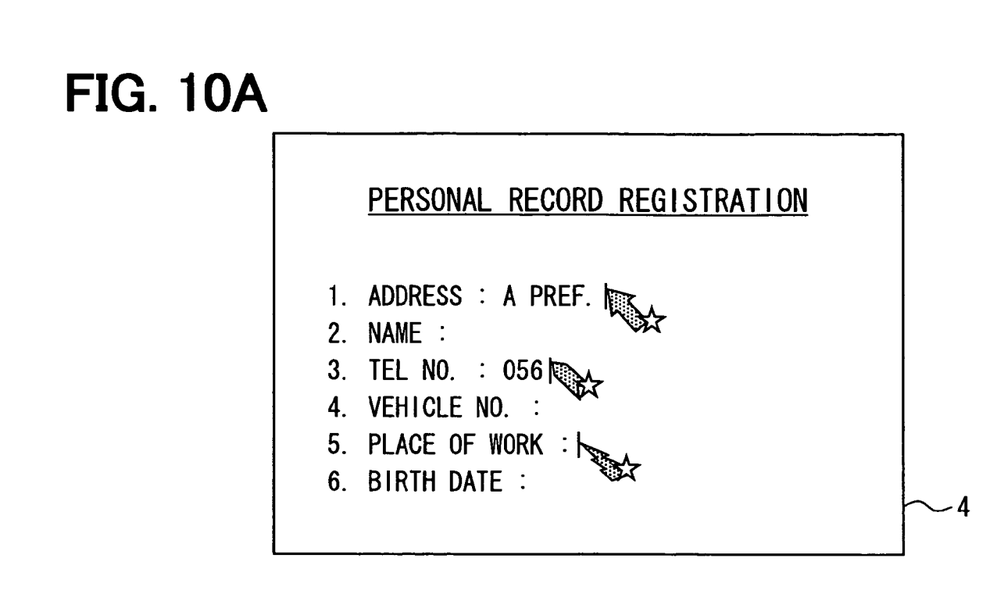
FIGS. 10A and 10B show illustrations of information registration screens.
Figure 10B:
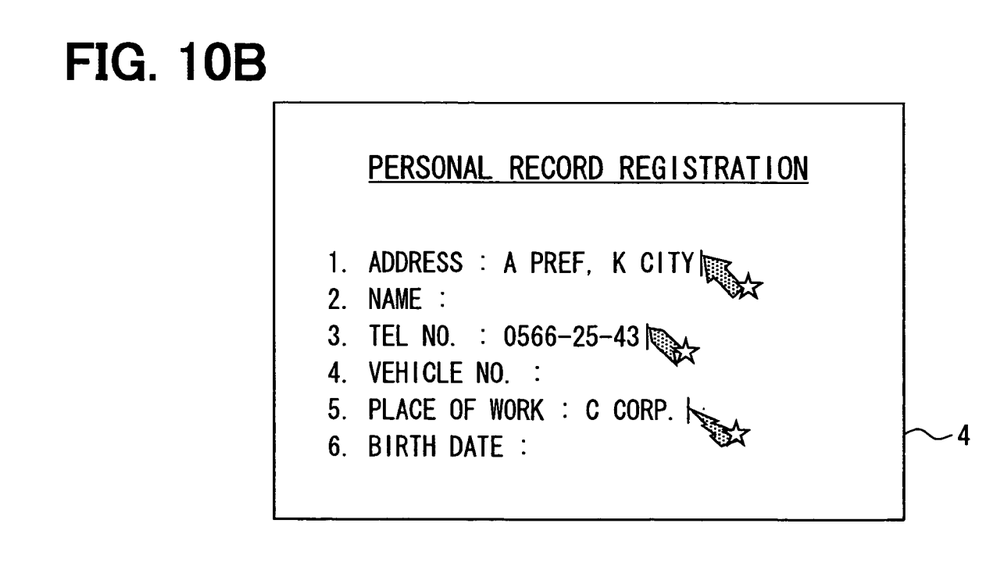

FIGS. 10A and 10B show illustrations of an information registration screen.

Each of the users A to C can input an address, a name, a telephone number, a vehicle number, a place of work, and a birth date in a personal record registration menu respectively. The control unit 2 displays inputted data in an address column upon detecting an input from the user A, and displays inputted data in a telephone number column upon detecting an input from the user B as shown in FIGS. 10A and 10B. The user C can also independently input a name of a workplace in a place of work column. The control unit 2 prohibits simultaneous input by two or more users for the same column.

The multiple cursor system in the navigation system 1 allows the users A to C to collaboratively use the display unit 4 and to register personal record data by having inputs from the portable controllers 7a to 7c respectively operated by the users A to C.

Although the present disclosure has been fully described in connection with the preferred embodiments thereof with reference to the accompanying drawings, it is to be noted that various changes and modifications will become apparent to those skilled in the art.

For example, the multiple cursor system may be applied to different types of computer systems from the navigation system in the vehicle, and may be applied to different types of applications from the destination search program and/or the personal record registration program described in the above embodiment. Further, the communication between the navigation system and the portable controllers may use wired connections instead of wireless connections.

Such changes and modifications are to be understood as being within the scope of the present invention as defined by the appended claims.

What is claimed is:

1. A multiple cursor system for controlling multiple cursors based on multiple communication links with multiple control devices, the multiple cursor system comprising:
    a communication unit for simultaneously establishing multiple communication links with multiple control devices for data communication;
    a cursor operation recognition unit for recognizing a cursor operation on each of the multiple control devices when the communication links with the multiple control devices are being established;
    a display unit for providing display space of the multiple cursors in association with information of interest; and
    a control unit for controlling display of the multiple cursors respectively representing one of the multiple control devices based on the cursor operation on each of the multiple control devices and for executing an instructed process based on an instruction in association with a position of one of the multiple cursors that represents one of the multiple control devices, wherein
    the control unit displays on the display unit a query message that asks for permission to switch screens when one of the multiple control devices sends to the control unit a request for switching screens on the display unit, the one of the multiple control devices requesting the switching of screens being distinguishably identified from other control devices in the query message, and
    the control unit switches the screens on the display unit based on the request when the other control devices give affirmative responses to the query message.

2. The multiple cursor system as in claim 1,
wherein the control unit displays respectively different cursor representations on the display unit for representing each of the multiple control devices.

3. The multiple cursor system as in claim 1,
wherein the control unit displays multiple cursor representations on the display unit based on each of the cursor representations respectively set by a user who holds one of the multiple control devices.

4. The multiple cursor system as in claim 1,
wherein the control unit controls movement of each of multiple cursor representations on the display unit respectively within a control range that corresponds one-to-one to a display range on each of the multiple control devices.

5. The multiple cursor system as in claim 1,
wherein the position of each of the multiple cursors on the display unit corresponds one-to-one to the position of the cursor on each of the multiple control devices.

6. The multiple cursor system as in claim 1,
wherein the control unit allows one of the multiple control devices to exclusively input a search condition for a specific search column at a specific time.

7. The multiple cursor system as in claim 1,
wherein the control unit allows one of the multiple control devices to exclusively specify an input for a specific column at a specific time.

8. The multiple cursor system as in claim 1,
wherein the control device includes at least one of a cellular phone and a personal digital assistant.

9. The multiple cursor system as in claim 2,
there being a single display unit providing display space of the respectively different cursor representations,
at least two of the respectively different cursor representations being displayed simultaneously on the single display unit.

10. The multiple cursor system as in claim 1,
the control unit superimposing an operability mark on one of the respectively different cursor representations only when a position of the one of the cursor representations falls within a predetermined operable area of the display unit in which a predetermined operation can be selected by one of the control devices represented by the cursor representation.

* * * * *